(12) United States Patent
Martin

(10) Patent No.: US 9,788,164 B2
(45) Date of Patent: Oct. 10, 2017

(54) METHOD AND APPARATUS FOR DETERMINATION OF KINEMATIC PARAMETERS OF MOBILE DEVICE USER

(71) Applicant: David Martin, San Francisco, CA (US)

(72) Inventor: David Martin, San Francisco, CA (US)

(73) Assignee: David Martin, San Francisco, CA (US)

( * ) Notice: Subject to any disclaimer, the term of this patent is extended or adjusted under 35 U.S.C. 154(b) by 35 days.

(21) Appl. No.: 14/326,674

(22) Filed: Jul. 9, 2014

(65) Prior Publication Data

US 2015/0018013 A1 Jan. 15, 2015

Related U.S. Application Data

(60) Provisional application No. 61/846,012, filed on Jul. 14, 2013.

(51) Int. Cl.
H04W 24/00 (2009.01)
H04W 4/02 (2009.01)
H04W 4/20 (2009.01)

(52) U.S. Cl.
CPC .......... *H04W 4/028* (2013.01); *H04W 4/027* (2013.01); *H04W 4/206* (2013.01)

(58) Field of Classification Search
CPC ...... H04W 4/027; H04W 4/028; H04W 4/206
USPC ........................................ 455/456.1, 456.3
See application file for complete search history.

(56) References Cited

U.S. PATENT DOCUMENTS

| | | | |
|---|---|---|---|
| 2012/0303271 A1* | 11/2012 | Chowdhary et al. | 701/433 |
| 2014/0142885 A1* | 5/2014 | Chowdhary et al. | 702/141 |
| 2014/0288878 A1* | 9/2014 | Donaldson | A61B 5/1123 702/141 |

OTHER PUBLICATIONS

Vidakovic et al, "Wavelets for Kids. A Tutorial Introduction" [unpublished, available online]. Institute of Statistics and Decision Sciences, Duke University, Durham, NC, 1991 [retrieved on Aug. 12, 2015]. Retrieved from the internet: <URL:http://gtwave.bme.gatech.edu/wp/kidsA.pdf>.*

* cited by examiner

*Primary Examiner* — Kwasi Karikari

(57) ABSTRACT

Some embodiments of the invention provide methods and apparatus for generating a user's contextual information using a mobile or wearable device. In some embodiments, obtaining the user's contextual information comprises obtaining sensors information, and applying a transformation to the sensors signals, wherein the transformation to the sensors signals comprises the use of wavelets, and the sensors comprise an accelerometer.

16 Claims, 3 Drawing Sheets

METHOD AND APPARATUS FOR DETERMINATION OF KINEMATIC PARAMETERS OF MOBILE DEVICE USER

CROSS-REFERENCE TO RELATED APPLICATIONS

This application claims priority from U.S. Provisional Patent Application Ser. No. 61/846,012, by David Martin, filed on Jul. 14, 2013, entitled "Method and apparatus for mobile context determination".

BACKGROUND

Field

This application relates to mobile and wearable devices, specifically to methodologies to obtain contextual information.

Discussion of Related Art:

Satellite-based approaches to estimate location and velocity are known to be very power-hungry, draining the battery of mobile devices in a short time. This is one of the disadvantages of having to work with signals transmitted from satellites. Moreover, the accuracy of satellite-based systems for mobile devices can be low, especially in urban areas with canyon effects, which represent additional obstacles for the weak satellite signals. Furthermore, these satellite-based systems are not reliable in indoor environments. Consequently, there is a need for an accurate methodology that can deliver contextual information including velocity for pedestrians in any condition, even when they are indoors.

Computer vision based systems make use of several cameras in a lab environment and markers attached at critical points of the individual's body. Cameras record the body movement, and the video processing can deliver accurate measurements. However, their sophisticated setup and requirements make them laborious, expensive, space-constrained and difficult to implement in real-time applications.

On the other hand, and thanks to the advancements in Micro Electro Mechanical Systems (MEMS) and wireless communications, monitoring systems based on wearable sensors are making progress. In this sense, the analysis of spatio-temporal parameters of human gait is a complex and difficult task. Moreover, sophisticated hardware requirements can raise the cost of the system.

For many applications, there is a need to efficiently leverage the sensors embedded in mobile and/or wearable devices to provide contextual information in real-time directly to the user.

DETAILED DESCRIPTION OF EMBODIMENTS OF THE INVENTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within some of the embodiments.

Figure 1:
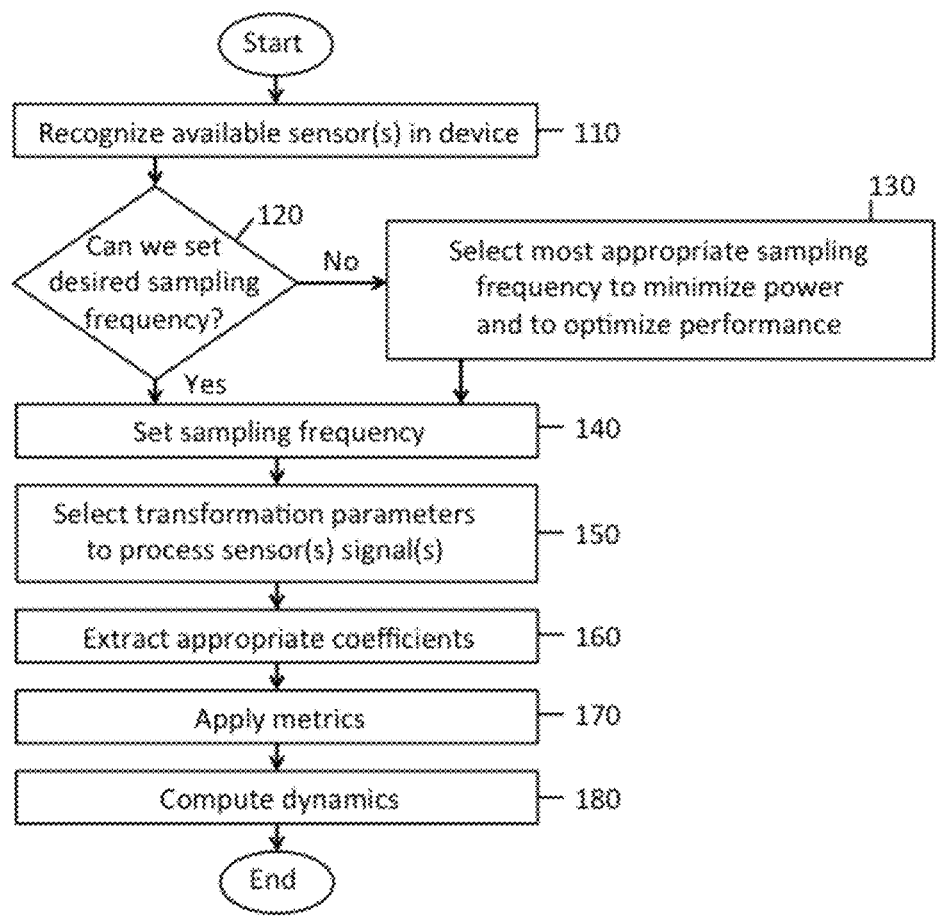
FIG. 1 illustrates a process flow diagram for the user's dynamics information determination process according to one embodiment.

In one embodiment, a method for providing a user's dynamics information is shown in FIG. 1, which illustrates a flow diagram of one embodiment with possible basic steps. The available sensors in the device are recognized in (110). Some embodiments will employ adaptable algorithms to be able to work with different types of devices (by way of example, and not limitation, different operating systems, different hardware features, different types of sensors, etc.). In some embodiments, the user's mobile device may have multiple sensors and sensor fusion techniques may be applied to enhance the solution. In other embodiments, the user's device may have very basic functionality and be equipped with a single accelerometer, and the algorithm will adapt to those devices to provide adequate results.

For the purpose of obtaining the dynamics of the user through the processing of sensor(s) signal(s), some embodiments select an appropriate sampling frequency, which optimizes performance and attempts to minimize power consumption. In some embodiments, it may not be possible to set a desired sampling frequency (120). By way of example, and not limitation, some operating systems may allow the selection of predefined sampling frequency levels, which can work as indicators of the final sampling frequencies, but there is no guarantee of obtaining a specific frequency value. In fact, the final sampling frequency values may also be device and hardware specific. In conclusion, the algorithm in some embodiments will need to adapt to the available sampling frequencies in each particular device. In this sense, the sampling frequency should be selected (130) taking into account at least two criteria: first, performance optimization; second, power consumption minimization. In fact, optimum performance may depend on the sampling frequency among other factors. In some embodiments, the quality of the results obtained through the application of the wavelet transform to process the sensor(s) (e.g. accelerometer) signal(s) will depend on the sampling frequency. Once the desired or available sampling frequency has been selected, that frequency is set in the device (140). Some embodiments may use single axis sensor information to be processed (by way of example and not limitation, acceleration in x-axis, acceleration in y-axis, acceleration in z-axis). Some embodiments may use the signal vector module to be processed (by way of example and not limitation, the signal vector module of a tri-axial accelerometer). Some embodiments may use different configurations and/or combinations of sensors signals (including but not limited to sensor fusion information) to be processed. It must be noted that in some embodiments, the set frequency may still vary depending on a variety of factors, including but not limited to, device-specific behavior. Consequently, in some embodiments, a frequency resetting procedure may be necessary to maintain desired performance. Some embodiments may use dynamic selection of sampling frequency; by way of example and not limitation, when periods of inactivity are detected, the sampling frequency can be reduced in order to minimize power consumption, and once some activity is detected again, the sampling frequency can be increased again to deliver desired performance.

In some embodiments, the selection of the transformation parameters to process the sensor(s) signal(s) may take place after the sampling frequency is set (150). In some embodiments, the wavelet transform may be applied for processing sensor(s) signal(s). In other embodiments, other transformations may be applied, including but not limited to, short-time Fourier transform, other techniques leveraging Fourier analysis, application of filter banks, etc. In other embodiments different combinations of techniques, methodologies and transformations including wavelets maybe used. In some embodiments, the parameters of each transformation, which by way of example and not limitation, may comprise levels of decomposition, mother wavelet, processing time window parameters, etc. may be set appropriately/dynamically to optimize performance and minimize computation burden.

In some embodiments, the appropriate transformation coefficients may be obtained (160) and be leveraged in subsequent processes in combination with other parameters and metrics (170). In some embodiments, the application of metrics with the previously obtained information results in excellent correlations with the velocity of the user, and the activity of the user (e.g. walking, running, jumping, etc.), leading to a characterization of the user dynamics (180). In some embodiments, by way of example and not limitation, weighted (e.g. by levels, number of coefficients, etc.) energies of wavelet transform coefficients may provide an excellent indicator to directly choose the appropriate coefficients from which to obtain a reconstructed wave whose positive-to-negative transitions will mark each step of the user. In some embodiments, useful metrics may comprise the summations of the square of transformation coefficients, these summations scaled by some factor (including but not limited to the number of coefficients, the number of levels of decomposition, a constant, etc.), or any other type of combinations. In some embodiments, the summations of weighted energies of transformation coefficients adequately scaled by some factor (including but not limited to level of decomposition) may provide an excellent correlation with the kinetic energy of the user. In some embodiments, some of the coefficients may be avoided for the calculation of metrics, and appropriate combinations of summations of weighted energies may be leveraged to compute information comprising velocity. In some embodiments, criteria to avoid transformation coefficients in the calculation of metrics may comprise: selection of a threshold, frequency content, etc. Some embodiments may leverage statistics (including but not limited to, range, mean, skewness, standard deviation, etc.) of the energies of transformation coefficients, or any other features or combinations thereof to be combined with the previously mentioned computed kinematic information and obtain user dynamics information comprising activity. By way of example and not limitation, some embodiments may leverage as metrics the summations of descriptive statistics (or combinations of them) of energies of transformation coefficients of predetermined levels (choice criteria may comprise threshold, frequency content, etc.), in combination with other summations of descriptive statistics (or combinations of them) of energies of transformation coefficients of predetermined levels (choice criteria may again comprise threshold, frequency content, etc.), in combination velocity information.

Some embodiments may leverage the previously mentioned information about the user's steps in combination with other metrics to enhance user's dynamics information, comprising velocity and activity. Some embodiments may leverage the obtained information on user's steps in combination with the information on user's dynamics to determine stride length. Some embodiments may leverage the information on user's dynamics to compute distance. Some embodiments may enhance distance through the combination of user's dynamics information with localization information. Some embodiments may use different techniques, principles and/or methodologies to obtain all the previous information and metrics, including but not limited to machine learning. In some embodiments, all the computation, processing, information presentation, and other steps may be carried out within a single mobile device without the need of external resources. In some embodiments, the computation or some other step or combinations of steps can be performed external to the mobile device, or with the assistance of some external element, such as external sensor, server, database or any other element. In some embodiments, software may be stored on the mobile or wearable device, for instance, in its memory for execution by its processor or processors. Some embodiments may store data structures and code on computer readable storage medium, which by way of example, and not limitation, may comprise field-programmable gate arrays, application-specific integrated circuits, magnetic and/or optical storage devices, etc.

Other configurations are also possible. By way of example, and not limitation, in some embodiments, all or part of the processes may be performed by chip-level systems, third-party applications, operating system kernel, firmware, or any other combination of hardware and/or software. In some embodiments, the software can be delivered in a variety of forms, including but not limited to, as stand-alone application, as library, as application programming interface, etc. In general, the functions of particular embodiments can be achieved by any means as is known in the art. Some embodiments can use distributed, networked sensors and/or systems, components, servers, databases, and/or circuits, and/or any combination of additional hardware and/or software and/or processing techniques and methodologies. Some embodiments can use any other type of sensor and/or system.

In some embodiments, sensors may be any of several types including, by way of example, and not limitation, any type of device, transducer or any other type of apparatus which can measure some quantity; in some embodiments, sensors may be implemented in any size, with any type of technique and technology, including but not limited to electronic, microelectronic, nanoelectronic, etc. By way of example, and not limitation, sensors may comprise any type of accelerometer, magnetometer, gyroscope, pressure sensor, proximity sensor, etc. and any other type of device sensitive to radio-frequency, sound, ultrasound, light, etc. including but not limited to, GPS antennas and/or their sensitive elements, WiFi antennas and/or their sensitive elements, and any other type of radio-frequency technology antennas and/or their sensitive elements. In some embodiments, sensors are integrated within the mobile or wearable device. In some embodiments, sensors or other mobile or wearable devices may be distributed outside the main mobile or wearable device, and they may communicate with the main mobile or wearable device by any means. Communication or transfer of data may be wired, wireless, or by any other means. In some embodiments, the user or other entity may rearrange characteristics of the components, or other features or elements of the system and the system can automatically adjust to new settings or arrangements.

Figure 2:
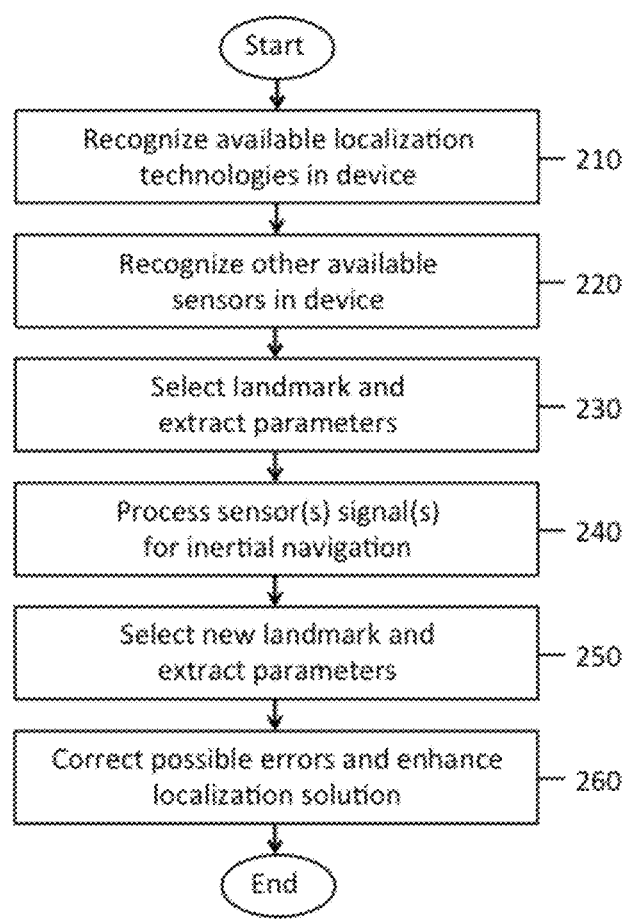
FIG. 2 illustrates a process flow diagram for the process to enhance a user's dynamics and localization information according to one embodiment.

In some embodiments, a method for enhancing a user's dynamics and localization information may be used as shown in FIG. 2, which illustrates a flow diagram of possible basic steps. The available localization technologies are recognized in (210). By way of example and not limitation, localization technologies or methodologies may include satellite-based systems such as GPS, radio-frequency fingerprinting based techniques, and others based on various techniques, principles and/or technologies, including their combinations through a variety of methodologies such as Kalman filtering, particle filtering, etc. Regarding the radio-frequency fingerprinting based techniques, several technologies may be employed, including but not limited to, WiFi, cellular, Bluetooth, Zigbee, digital television, etc. In some embodiments, the use of satellite-based localization technologies may be avoided because the user may be located within buildings, urban canyons, or other environments in which the performance of these technologies is degraded. Even in those outdoor environments where the device can receive good quality signal from the satellites, these satellite-based systems may be avoided due to their high power consumption. In some embodiments, other localization techniques, technologies and methodologies may be used, including but not limited to, Near Field Communications, Ultra Wide Band, acoustic, ultrasound, any type of radio-frequency, etc. The available sensors in the device are recognized in (220). In some embodiments, these sensors may include accelerometer, magnetometer, gyroscope, pressure sensor, and others. In some embodiments, the device may include very basic functionality and the algorithm may need to adapt and perform efficiently with a single accelerometer. In other embodiments, the sensors in the device may include more than a single accelerometer, and sensor fusion techniques may be used. In other embodiments, other configurations of sensors may be possible.

In some embodiments, recognizable places may be set as landmarks from which to extract very precise features regarding their location and general context (230). By way of example and not limitation, Radio Frequency Identification, Bluetooth, Zigbee and/or other technologies and/or combinations of them may be leveraged using a variety of techniques to identify landmarks with a very high resolution. Leveraging the information on the user's dynamics, some embodiments may obtain accurate inertial navigation information (240). In some embodiments with basic functionality where the device may not be equipped with gyroscope and/or magnetometer, a variety of mechanisms to identify straight-line trajectories may be leveraged to adapt the inertial navigation solution. When a new identifiable landmark is reached, location and general context features are extracted (250). By way of example and not limitation, some embodiments may use GPS outdoors, or radio beacons indoors detected as peaks in signal strength within a radio-fingerprinting localization system, to identify landmarks. In other embodiments, the use of other types of beacons or landmarks, derived from a variety of technologies, that may use a variety of principles to obtain the required information, is also possible. This information may be leveraged using a variety of possible techniques and methodologies to correct possible errors on the user's dynamics and enhance the localization solution (260). Some embodiments may use manual calibration by the user introducing required calibration parameters in ways he/she may choose from a variety of techniques, technologies and methodologies. Other embodiments may use automatic calibration. In some embodiments, the calibration may be successfully applied to enhance both the information on localization and the user's dynamics and contextual information.

Some embodiments may use all the available information to identify the position (and transitions between positions) of the mobile device within the user's body; by way of example and not limitation, the position information may comprise: held in front in reading position, held in hand while walking, held in pocket while walking, etc. Some embodiments may use external elements comprising user's input to identify positions; in other embodiments, positions will be recognized internally by the mobile device leveraging sensors information.

Figure 3:
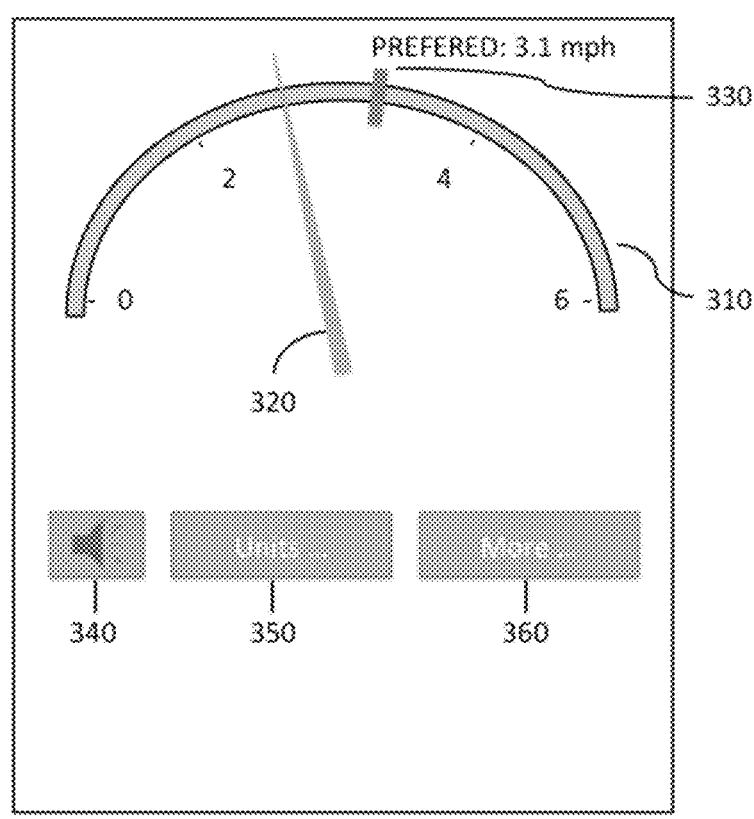
FIG. 3 shows an example of an embodiment of the presentation of contextual information on a mobile device.

In some embodiments, the contextual information may be displayed directly on the mobile device display. By way of example and not limitation, the velocity of the user may be displayed in real time (typically, fractions of a second) on the mobile device display as shown in FIG. 3, which illustrates an example of the many possibilities. Some embodiments may present the real time value and evolution of the contextual information on the mobile device. Other embodiments may display the contextual information on an external managing or monitoring entity, which may comprise computing and storing resources. Other embodiments with different configurations and/or combinations thereof are also possible. In some embodiments, a semicircular scale may be used to represent the velocity magnitude (310), and it may be calibrated in different and adaptable units and values depending on context. By way of example and not limitation, walking velocities may be represented from 0 miles-per-hour (mph) to 6 mph. In addition, the scale may include a variety of features, such as the preferred walking velocity (330) or others. These features may be average values or personalized values for each particular user. Other embodiments may use other types of features and/or combinations thereof. By way of example and not limitation, some embodiments may use a semicircle with different colors representing velocity values.

In some embodiments, the representation of a moving needle (320) may be leveraged to indicate the real time velocity of the user. In other embodiments, other representations may be leveraged to indicate the real time velocity of the user, including but not limited to, the surface of a varying semicircle whose angle grows from 0 degrees to 180 degrees depending on the velocity. In other embodiments, semi-arcs or other types of geometries, shapes, sizes, figures, etc. may also be leveraged. In some embodiments, combinations geometries and/or color may also be leveraged to display the velocity information. In some embodiments, the presentation of information to the user or to any type of managing or monitoring entity may be performed personalized and in any of several ways including, by way of example, and not limitation, visual, acoustic, etc. For example, a button for sound (340) may be used to enable or disable the acoustic delivery of contextual information. This button may also be leveraged to enable or disable playing music or other encouraging sound in the background, or to trigger an out-loud-reader mechanism to read-out-loud contents on the display (e.g. text from a website, messages received from friends, etc.) when predetermined and/or selectable thresholds or levels on the user's velocity or general context are reached. Another button may be used to change the units of the velocity (350), for example, meters per second, kilometers per hour, etc. In some embodiments, automatic localization or other means may be leveraged to infer the country of the user and automatically adapt units, language, and other variables. Additional buttons (360) may also be employed for other purposes, including but not limited to, displaying a time evolution of the user velocity, dynamics, or general context over a selected or available period of time, allow personalized calibration, set preferences, etc.

Some embodiments may use any type of smartphones, mobile devices, wearable devices and/or sensors, or any other types of devices or combinations of them, including but not limited to, personal digital assistants, personal navigation systems, portable electronic devices, tablets, laptops, computers, and their peripheral devices. In some embodiments, the definition of mobile device may comprise any type of mobile phone, smartphone, wearable device and/or sensor, or any other types of device or wearable or combinations of them.

Some embodiments may use combinations of strategies and techniques, including, by way of example, and not limitation, machine learning techniques, probabilistic models, sensor fusion techniques, extraction of statistics, employment of filter banks, application of dimensionality reduction techniques, a variety of approaches for classification, etc. Details are omitted to improve the clarity of the description. In addition, some embodiments may use a variety of programming languages and methodologies in combination with varied hardware configurations and execution strategies.

Some embodiments may leverage context information and provide supplemental information, which can be obtained through any means and sources, including but not limited to, social networks. Particular embodiments may also be used for targeted advertising or targeted information based on context, enable shopping of any type of product or service which may or may not be related to the contextual information, etc.

In some embodiments, various applications may use the obtained information as a trigger for activation. Alternatively, a user may be able to set preferences for different applications depending on the obtained information. By way of example, and not limitation, a user may set the font size and other features of the content (also obtainable through internet or any other means) in his/her mobile device display according to his/her dynamics to improve the reading experience. By way of example, and not limitation, the user may or may not have ear-speakers or head-phones or any other appropriate hardware connected to his/her device and he/she may opt for triggering an out-loud-reader or other type of application to read-out-loud or in some other way adapt the presentation of the content in the device display when his/her dynamic information stays within some preselected threshold levels. By way of example, and not limitation, application(s) and/or service(s) may request, trigger or in some way enable advertising from a commercial ad server or any other type of server or entity using either velocity information, user dynamics, key words, or other criteria as advertising keys. In some embodiments, the user's velocity and other information, including advertisements, may be presented on the mobile and/or wearable device for consideration by the user. Again, depending on preferences and personal privacy policies, information and lists of acquaintances, either desired or undesired, may be presented to the user or to desired friends or other people.

Some embodiments may be used to enhance the location information and to identify points of maximum wireless signal strength, or points with no signal strength, enabling applications or services that effectively leverage that information. Applications of some embodiments may include route searching, planning and optimization, precise geo-tagging of photos, etc. By way of example and not limitation, personalized routing in maps using pedestrian velocity, may enhance features such as travel time estimation, places of interest, navigation, context-based search, etc. For example, a pedestrian walking from home to University may be more interested in sandwich shops rather than gas stations.

Applications of some embodiments may comprise monitoring a variety of information of people in a variety of circumstances or contexts, including but not limited to, health-care, army, sports, etc. Some embodiments may perform the monitoring in a remote way and/or extend the monitoring to animals, robots, machines, etc. In some embodiments, services can be provided through subscription. Some embodiments may be applied for the estimation of calories consumption, or the diagnosis of diseases, such as Parkinson's or other neurodegenerative diseases. Some embodiments may be applied for the identification and/or treatment of disorders, such as gait disorders, associated with a wide variety of conditions, including but not limited to neurologic and orthopedic conditions. Some embodiments may obtain a wide variety of user's information, including but not limited to velocity, activity, stride length, cadence, step count, gait patterns, distance, etc. Some embodiments may apply the information to help in the prevention of falls, accidents or any other undesirable events. Applications of some embodiments may also include contextual interactions, interactive games, augmented reality, and other types of services. By way of example, and not limitation, in games, the attacking and/or crashing strength or power of a user can be set proportional to his/her velocity and certain events or communications may be triggered based on context.

In some embodiments, the obtained information may be used for social networking applications, such as finding and/or establishing communication and/or sharing information with friends and/or other people and/or groups of people whose contextual information might or might not in some way be related. By way of example, and not limitation, in some embodiments, users may be able to share and see the real-time and/or historical contextual information of their friends, edit contextual information on maps, etc. In some embodiments, the observation of two or more mobile and/or wearable devices following similar contextual patterns, may lead to infer a friendship.

Some embodiments may also be applied to infer information from a wide range of biological or other types of sensors/signals, either from humans, animals, mechanical entities such as robots or other machines, etc. Other embodiments can also be applied to monitor and optimize a variety of processes, including but not limited to, industrial and managerial processes. Other embodiments may also have many more applications.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A method for monitoring a mobile device user in real time, the method comprising the following steps:
   reading data from an accelerometer within the mobile device;
   obtaining energies of wavelet transformation coefficients of the accelerometer data;
   weighting the energies of wavelet transformation coefficients; obtaining a summation of said weighted energies, and leverage said summation to estimate a velocity of the user of the device;
   leveraging the weighted energies of the wavelet transformation coefficients to choose the coefficients from which to obtain a reconstructed wave from where each stride of the user is clearly identified;
   combining stride time information with the velocity estimation to estimate stride length.

2. The method of claim 1, further comprising:
   presenting an instantaneous value of said velocity on the mobile device in real time.

3. The method of claim 2, wherein all the steps are performed in the mobile device without relying on elements external to the mobile device.

4. The method of claim 3, further comprising:
   dynamic selection of accelerometer sampling frequency and wavelet transformation parameters, comprising levels of decomposition, mother wavelet, and processing time window.

5. The method of claim 1, further comprising:
   combining the user's velocity with other information for enhanced localization and calibration.

6. The method of claim 1, further comprising:
   presenting on the mobile device a moving object whose movement is controlled by the obtained velocity.

7. An apparatus comprising:
   a processor;
   a non-transitory processor-readable medium including one or more instructions which, when executed by the processor, causes the processor to monitor a mobile device user in real time by the steps of:
   reading data from an accelerometer within the mobile device;
   obtaining energies of wavelet transformation coefficients of the accelerometer data;
   weighting the energies of wavelet transformation coefficients; obtaining a summation of said weighted energies, and leverage said summation to estimate a velocity of the user of the device;
   leveraging the weighted energies of the wavelet transformation coefficients to choose the coefficients from which to obtain a reconstructed wave from where each stride of the user is clearly identified;
   combining stride time information with the velocity estimation to estimate stride length.

8. The apparatus of claim 7, further comprising:
   presentation of an instantaneous value of said velocity on the mobile device in real time.

9. The apparatus of claim 8, further comprising:
   dynamic selection of accelerometer sampling frequency and wavelet transformation parameters, comprising levels of decomposition, mother wavelet, and processing time window.

10. The apparatus of claim 7, further comprising:
    combination of the user's velocity with other information for enhanced localization and calibration.

11. The apparatus of claim 7, further comprising:
    presentation on the mobile device of a moving object whose movement is controlled by the obtained velocity.

12. A non-transitory processor-readable medium including instructions which, when executed by a processor, causes the processor to monitor a mobile device user in real time by the steps of:
    reading data from an accelerometer within the mobile device;
    obtaining energies of wavelet transformation coefficients of the accelerometer data;
    weighting the energies of wavelet transformation coefficients; obtaining a summation of said weighted energies, and leverage said summation to estimate a velocity of the user of the device;
    leveraging the weighted energies of the wavelet transformation coefficients to choose the coefficients from which to obtain a reconstructed wave from where each stride of the user is clearly identified;
    combining stride time information with the velocity estimation to estimate stride length.

13. The non-transitory processor-readable medium of claim 12, further comprising:
    presentation of an instantaneous value of said velocity on the mobile device in real time.

14. The non-transitory processor-readable medium of claim 13, further comprising:
    dynamic selection of accelerometer sampling frequency and wavelet transformation parameters, comprising levels of decomposition, mother wavelet, and processing time window.

15. The non-transitory processor-readable medium of claim 12, further comprising:
    combination of the user's velocity with other information for enhanced localization and calibration.

16. The non-transitory processor-readable medium of claim 12, further comprising:
    presentation on the mobile device of a moving object whose movement is controlled by the obtained velocity.

* * * * *